(12) United States Patent
McDonough et al.

(10) Patent No.: US 6,606,823 B1
(45) Date of Patent: Aug. 19, 2003

(54) MODULAR ROOF COVERING SYSTEM

(75) Inventors: William McDonough, Charlottesville, VA (US); Michael Braungart, Buchholz in der Nordheide (DE); Paul J. Clark, Eugene, OR (US)

(73) Assignees: Ford Motor Land Development Corporation, Dearborn, MI (US); McDonough, Braungart Design Chemistry, Charlotesville, VA (US)

( * ) Notice: Subject to any disclaimer, the term of this patent is extended or adjusted under 35 U.S.C. 154(b) by 3 days.

(21) Appl. No.: 10/101,320

(22) Filed: Mar. 20, 2002

(51) Int. Cl.[7] .......................... A01G 9/02; E04H 14/00; E04C 3/00
(52) U.S. Cl. ...................... 47/65.9; 52/173.1; 52/173.3; 52/578
(58) Field of Search .............................. 52/173.1, 173.3, 52/578, 604, 408; 47/65.9, 1.01 F, 1.01 R, 65.5, 85, 86

(56) References Cited

U.S. PATENT DOCUMENTS

| | | | |
|---|---|---|---|
| 4,674,244 A | | 6/1987 | Francovitch |
| 4,800,675 A | | 1/1989 | Feil et al. |
| 4,886,554 A | | 12/1989 | Woodring et al. |
| 4,926,586 A | | 5/1990 | Nagamatsu |
| 4,936,063 A | | 6/1990 | Humphrey |
| 5,287,650 A | | 2/1994 | Moriguchi et al. |
| 5,316,592 A | | 5/1994 | Dinwoodie |
| 5,390,442 A | | 2/1995 | Behrens |
| 5,410,840 A | * | 5/1995 | Loesken .................. 47/58.1 R |
| 5,505,788 A | | 4/1996 | Dinwoodie |
| 5,571,338 A | | 11/1996 | Kadonome et al. |
| 5,590,495 A | | 1/1997 | Bressler et al. |
| 5,595,021 A | * | 1/1997 | Ripley et al. ................. 47/66.5 |

(List continued on next page.)

FOREIGN PATENT DOCUMENTS

| | | | | |
|---|---|---|---|---|
| DE | 3627507 A1 | * | 2/1988 | ............ A01G/7/00 |
| DE | 3734334 A1 | * | 4/1989 | ............ A01C/1/06 |
| DE | 3930498 C1 | * | 4/1991 | ............ A01G/9/02 |
| DE | 3936264 A1 | * | 5/1991 | ............ A01G/9/00 |
| EP | 575940 A1 | * | 12/1993 | ............ E04D/11/00 |
| EP | 1 059 396 A1 | | 12/2000 | |

(List continued on next page.)

OTHER PUBLICATIONS http://ecoroofsystems.com_construct.html□□.*
Chicago's Green Rooftops□□Nov. 7, 2001□□pp. 10–17.*
"Rug Roofs™ Disclosure Document", Sep. 29, 1997, Disclosure Document No. 426165, filed Oct. 6, 1997 in the USPTO.

(List continued on next page.)

*Primary Examiner*—Carl D. Friedman
*Assistant Examiner*—Kevin McDermott
(74) *Attorney, Agent, or Firm*—Sughrue Mion, PLLC

(57) ABSTRACT

The present invention is a modular roof covering made up of a plurality of interlocking modular trays having moisture or water absorbing component or medium in the tray to absorb moisture and allow it to evaporate or otherwise dissipate over time. The trays interlock with each other and are held down by weights or other ballast to secure the trays to the roof without having to create a physical connection between the trays and the roof structure. The modular roof covering can be made up of different types of tray assemblies, where some have vegetation growing in the tray, others have merely water absorption and dissipation capability, while others have photovoltaic cells for the collection and use of solar energy. The present invention provides a light weight, low cost roof covering system for extending the life of current roof structures, and to restore and protect the environment, moderate and aid in controlling building temperature, manage stormwater runoff and collect and utilize solar energy.

24 Claims, 12 Drawing Sheets

U.S. PATENT DOCUMENTS

| | | | | | |
|---|---|---|---|---|---|
| 5,608,989 | A | * | 3/1997 | Behrens | 47/65.9 |
| 5,614,269 | A | | 3/1997 | Hoskins et al. | |
| 5,647,915 | A | | 7/1997 | Zukerman | |
| 5,724,766 | A | | 3/1998 | Behrens | |
| 5,746,839 | A | | 5/1998 | Dinwoodie | |
| 5,768,831 | A | | 6/1998 | Melchior | |
| 5,836,107 | A | * | 11/1998 | Behrens | 47/56 |
| 5,887,397 | A | * | 3/1999 | Repasky | 52/302.4 |
| 5,983,561 | A | | 11/1999 | Behrens | |
| 6,046,399 | A | | 4/2000 | Kapner | |
| 6,061,978 | A | | 5/2000 | Dinwoodie et al. | |
| 6,065,256 | A | | 5/2000 | Joko et al. | |
| 6,105,316 | A | * | 8/2000 | Bottger et al. | 52/173.3 |
| 6,182,404 | B1 | | 2/2001 | Rinklake et al. | |
| 6,232,520 | B1 | * | 5/2001 | Hird et al. | 604/368 |
| 6,237,285 | B1 | * | 5/2001 | Yoshida et al. | 47/65.9 |
| 6,370,828 | B1 | * | 4/2002 | Genschorek | 52/200 |
| 6,397,520 | B1 | * | 6/2002 | Kosinski | 47/64 |
| 6,526,710 | B1 | * | 3/2003 | Killen | 52/220.1 |
| 2002/0007592 | A1 | * | 1/2002 | Mischo | 47/65.9 |
| 2002/0007593 | A1 | * | 1/2002 | Mischo | 47/86 |
| 2002/0095907 | A1 | * | 7/2002 | Robertson | 52/745.06 |

FOREIGN PATENT DOCUMENTS

| | | | | | |
|---|---|---|---|---|---|
| JP | 2-163009 | | | 6/1990 | |
| JP | 05095734 | A | * | 4/1993 | A01G/9/00 |
| JP | 05284857 | A | * | 11/1993 | A01G/9/02 |
| JP | 6-113677 | | | 4/1994 | |
| JP | 06209655 | A | * | 8/1994 | A01G/9/02 |
| JP | 7-213159 | | | 8/1995 | |
| JP | 8-317730 | | | 12/1996 | |
| JP | 9-140252 | | | 6/1997 | |
| JP | 10248393 | A | * | 9/1998 | A01G/9/02 |
| JP | 11-32579 | | | 2/1999 | |
| JP | 11-80058 | | | 3/1999 | |
| JP | 11318210 | A | * | 11/1999 | A01G/7/00 |
| JP | 2000004679 | A | * | 1/2000 | A01G/9/02 |
| JP | 2000-166375 | | | 6/2000 | |
| JP | 2002017161 | A | * | 1/2002 | A01G/7/00 |
| JP | 2002101755 | A | * | 4/2002 | A01G/1/12 |
| JP | 2002209451 | A | * | 7/2002 | A01G/9/02 |

OTHER PUBLICATIONS

Erisco Bauder Green Roof Systems, "Waterproofing Systems for Landscape Roofs," Jan. 2000.

Greenbacks From Green Roofs: Forging a New Industry in Canada, "Status Report on Benefits, Barriers and Opportunities for Green Roof and Vertical Garden Technology Diffusion," by Steven W. peck et al, of Peck & Associates for Canada mortgage and Housing Corporation, Mar. 1999.

http://www.greengridroofs.com.

http://www.benchmark–inc.com/roofinfo/articles/issue32b.html.

http://www.app.hu/ir.htm.

http://www.hoogovens.co.uk/products/zip/nat2.htm.

http://www.utoronto.ca/envstudy/INI498/majnat.htm.

http://www.edcmag.com/archives/01–01–4.htm.

http://soilslab.cfr.wahsington.edu/esc311–507/2000/Final-Projects/Gunter–Barnes–Swanson.

"It's Not Easy Selling a Green Roof, But They're Trying," *New York Times*, Jan. 16, 2001.

Green Rooftop Technology Saves Energy, Cools Air, *CNN*, Jan. 1, 2000, (www.cnn.com/2001/NATURE/01//01rooftop-.gardens.enn/index.html).

"Tokyo wants rooftop gardens to combat warming," *Associated Press*, Dec. 10, 2000, (www.enn.com/news/wire–stories/2000/12/12102000/ap roofgardens 40704.asp).

"Ford Thinks Green for Historic River Rouge Plant," *New York Times*, Nov. 26, 2000.

"Up on a Housetop, Green, Green, Green," *Pittsburgh Post Gazette*, Nov. 23, 2000, (www:post–gazette.com/region-state/2001123green2.asp. e=doc.tmpl).

"Going Green to Reduce Energy Costs," *Washigton Post*, Nov. 11, 2000.

"Cooling Chicago, Starting with a Garden on the Roof of City Hall," *New York Times*, Oct. 28, 2000.

"Scientists Watch Cities Make Their Own Weather," *New York Times*, Aug. 15, 2000.

"Battery park to Get a "Green" High–rise," *New York Times*, Feb. 10, 2000.

"Green Roofs, Cool City," *ABC News*, Apr. 5, 1999, (www.Absnews.go.com/sections/science/DailyNews/cityheat990405.html).

"Team probes Atlanta heat Island," *CNN*, Mar. 24, 1999, (www.cnn.com/NATURE/9903/25/heat.island.enn).

* cited by examiner

MODULAR ROOF COVERING SYSTEM

BACKGROUND OF THE INVENTION

The present invention relates to the field of roof coverings, in particular a modular roof covering system which extends longevity of traditional roofing membranes, restores and protects the environment, moderates and helps control building temperature, manages stormwater runoff and collects and utilizes solar energy.

To maintain a comfortable interior space at a low cost, many advances have been made in roofing and insulation technology. Most developments have been made in the materials which are placed in the attic space such as slurried or rolled insulation. There has been relatively little development in materials applied to the exterior surfaces of roofs. As costs for energy and concerns over the environment increase, there is an increasing demand for low cost, energy efficient methods to reduce the amount of energy needed to maintain a comfortable living and work space, particularly in existing buildings where the costs of most modem solutions can be prohibitive.

To address these concerns, additional roofing coverage has been placed over the standard or existing roofing materials for added thermal insulation. One example of additional roofing coverage is vegetation. A covering of vegetation on a roof structure provides a layer of insulation that helps keep the building interior cool in the summer and warm in the winter. Most modem turf covering methods or systems use a layer of soil and a complex system of multi-layered materials to protect the underlying structure from damage. This type of construction is expensive, can add a significant amount of weight to the roof, and may require significant modification to the roof or physical attachment to the roof structure. Because of the high costs and undesirable weight additions of most current systems, many existing buildings cannot utilize these systems.

SUMMARY OF THE INVENTION

The present invention provides a light weight and low cost alternative for roof coverings to extend longevity of traditional roofing membranes, restore and protect the environment, moderate and help control building temperature, manage stormwater runoff and collect and utilize solar energy.

The present invention uses a series of modular interlocking trays or containers which hold several functional layers, which vary from embodiment to embodiment depending on the design requirement for the particular application. The trays are interlocked with each other, or otherwise connected to each other to cover a large area on a roof or other surface. Additionally, the trays are ballasted or weighted down without being physically connected to the roof surface on which they are positioned.

In the first embodiment, the top layer in the modular trays is a layer which consists of vegetation, such as grass or sedum species, which is selected to accommodate the climate in which the system is used and address any aesthetic intentions or requirements. Under the top layer is a lightweight soil matrix layer to support the plant growth, by providing support for the roots. Below the soil matrix layer is a filter layer to prevent erosion of the soil matrix layer and to remove particulate and other matter from the water runoff, and a water-capture area (in the tray) to mitigate storm water runoff.

The trays are ballasted or weighted down by any commonly known or used method, but preferably by paving stones which are laid in spaces created by the interconnection of the trays. In addition to providing ballast, the paving stones also provide a means to move about the roof without stepping into or otherwise disturbing the vegetation growing in the trays. Optionally, in this embodiment, an irrigation or sprinkler system can be installed to provide water irrigation for the vegetation or additional cooling for the building. This is particularly applicable to hotter and dryer climates. In this embodiment the modules may be pre-assembled, requiring only installation of the modules on the roof or other surface, or the vegetation may be added after the modules are placed in position through the use of seeds, cuttings, or root formed plugs.

In the second embodiment, there is also a series of functional layers. In this embodiment, the top layer consists of a permeable membrane rather than vegetaion that allows water to flow through. Below the top membrane is a reservoir designed to capture, hold and slowly release precipitation and moisture through evaporation and/or drainage (when the membrane becomes saturated). In an alternative embodiment, the reservoir contains an absorbent or super absorbent polymer ("SAP") to further increase the water absorption and/or reduce runoff. Below the reservoir layer is a roof drainage layer, that holds the layers positioned above it above the roofing membrane. The roof drainage layer allows excess precipitation to flow off of the roof, without compromising the integrity of the modules or the layers positioned therein. It is noted that although this embodiment includes the interlocking modular trays previously discussed, the functional layers may be enclosed in moisture absorbent bags which are secured together, without the use of the trays. A sprinkler system may be installed to provide moisture to the functional layers of this system depending on the climate and system requirements. Further, any suitable ballast or weighting system can be used to provide support and security for this embodiment.

The third embodiment of the present invention uses modular trays to support a top layer consisting of a housing or structure holding an array of (or single) photovoltaic cells or panels and drainage holes. The housing allows the cells or array to pivot and/or rotate thereby tracking the sun for optimum performance of the cells or array. Below the array or cell housing is a reservoir designed to capture, hold and slowly release moisture or precipitation through drainage and/or evaporation. This reservoir function is similar to, and can be, the same structure and method described above in the second embodiment.

Because the underlying modules or trays for each of the above embodiments can be the same, a roofing system can be installed which utilizes a combination of any of the above embodiments. The present invention is not limited to the use of a single embodiment in any one roofing system.

The present invention provides a low-cost, low-weight system for moderating building temperature and increasing the useful life of roof coverings and structure while at the same time reducing energy use and environmental impact.

BRIEF DESCRIPTION OF THE DRAWINGS

The advantages, nature and various additional features of the invention appear more fully upon consideration of the illustrative embodiments of the invention which are set forth in the drawings, in which.

DETAILED DESCRIPTION OF THE INVENTION

The present invention is now explained in further detail with reference to the accompanying drawings, which do not limit the scope of the invention in any way.

Figure 1:
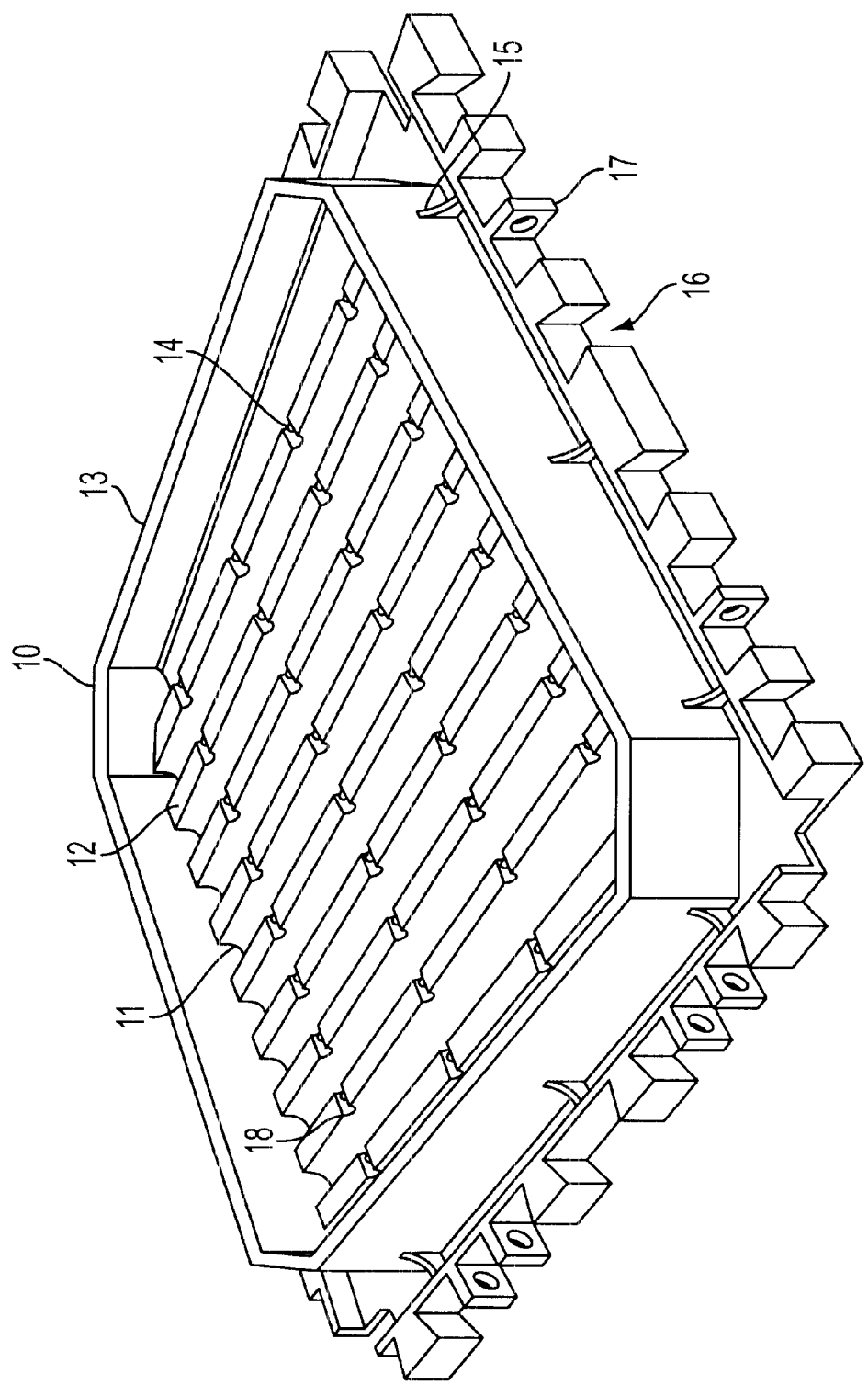
FIG. 1 is a diagrammatical representation of a modular tray according to the present invention which can be used with any of the embodiments of the present invention.

Turning now to FIG. 1, this Figure shows a typical modular tray 10 that can be used with any of the various embodiments of the present invention. The tray 10 can be made from any known commonly available material, limited only by manufacturing limitations and cost restraints, and can be made in any practical size or shape as design parameters permit. In a preferred embodiment, the trays 10 are shaped to allow ballast or weights 23 placed in cavities formed between the assembled trays as shown in FIG. 1. Such a shape allows easy installation of ballast to aid in keeping the trays 10 secure to a roof under adverse conditions. Although the tray 10 shown in FIG. 1 is an eight-sided rectangle with beveled corners to create the space for the ballast weight, the present invention is not limited to this shape configuration. For example, the trays 10 can be configured in a rectangular shape having mid-span indentations in each of the sidewalls in which the ballast is placed upon installation.

Materials that can be used for the modular trays include any polymer or plastic type material or any metal material including aluminum. In the preferred embodiment the material used is aluminum (for example 3003 H14 aluminum) as it is relatively strong, light and easy to manufacture. Because of its relative strength, the thickness of a metal tray can be thinner than other materials. The tray 10 can be manufactured by any known method, and the method of manufacture is generally selected for the material used. For example, if a plastic is used then injection molding may be used, while if the tray is made from a metal then stamping may be the most appropriate manufacturing technique.

A preferred embodiment of a polymer material is a co-polymer which contains approximately a 50% polypropylene and 50% polyethylene mix. The wall thickness of a polymer tray is generally thicker than that of an aluminum tray.

As shown in FIG. 1, the tray module 10 has a series of troughs 11 and ridges 12 to provide structural stability and precipitation or water storage capability, surrounded by walls 13. Water is stored in the troughs 11 to allow slow evaporation over time, instead of allowing the water to runoff immediately after it passes through the layers (discussed below). The walls 13 have a height determined by the design for the particular application and vary depending on the specific application. Further, in a preferred embodiment the walls 13 of the tray 10 are substantially perpendicular to the surface of the roof when the trays are installed in the roof system. This is not necessary, and the angle at which the walls 13 project from the tray 10 can be optimized for each particular application of the present invention. Additionally, in a preferred embodiment, the ridges 12 may have slight depressions 18 with holes 14 to allow excess water to drain out of the tray 10, when the tray 10 becomes full. These holes prevent the trays 10 from becoming overfilled with precipitation, thus regulating the weight on the roof and preventing saturation damage to the various layers or structure placed on the trays 10. The drain holes 14 may alternatively be located within the troughs 11, and be placed some distance from the bottom of the troughs. The placement of the drain holes 14 are determined by the design of the roof system and weight limitations of the roof structure. The higher the holes within the tray 10, the greater total weight that the roof is required to hold.

Further, in an alternate embodiment of the present invention, at least some of the trays 10 installed on a roof have sprinkler line attachments or connections 15 which allow plumbing for a sprinkler system secured to the trays 10 to prevent unnecessary damage to the sprinkler system. Although in FIG. 1 the tray 10 is shown with these connections 15 on the outside perimeter of the tray 10, these connections 15 can also be made at the bottom of the tray 10, to allow the plumbing network for the sprinkler system placed under the trays, instead of between them. This allows the trays placed closer together to optimize roof space. When this configuration is used, the trays 10 access slots 35, as shown in FIG. 6, to allow the sprinkler network placed under the trays 10. The use of the sprinkler connections 15 is not necessary, but is preferred when a sprinkler system is used as exhibited in FIGS. 1–4. However, the preferred irrigation method for the present invention is that shown in FIG. 5.

Figure 6:
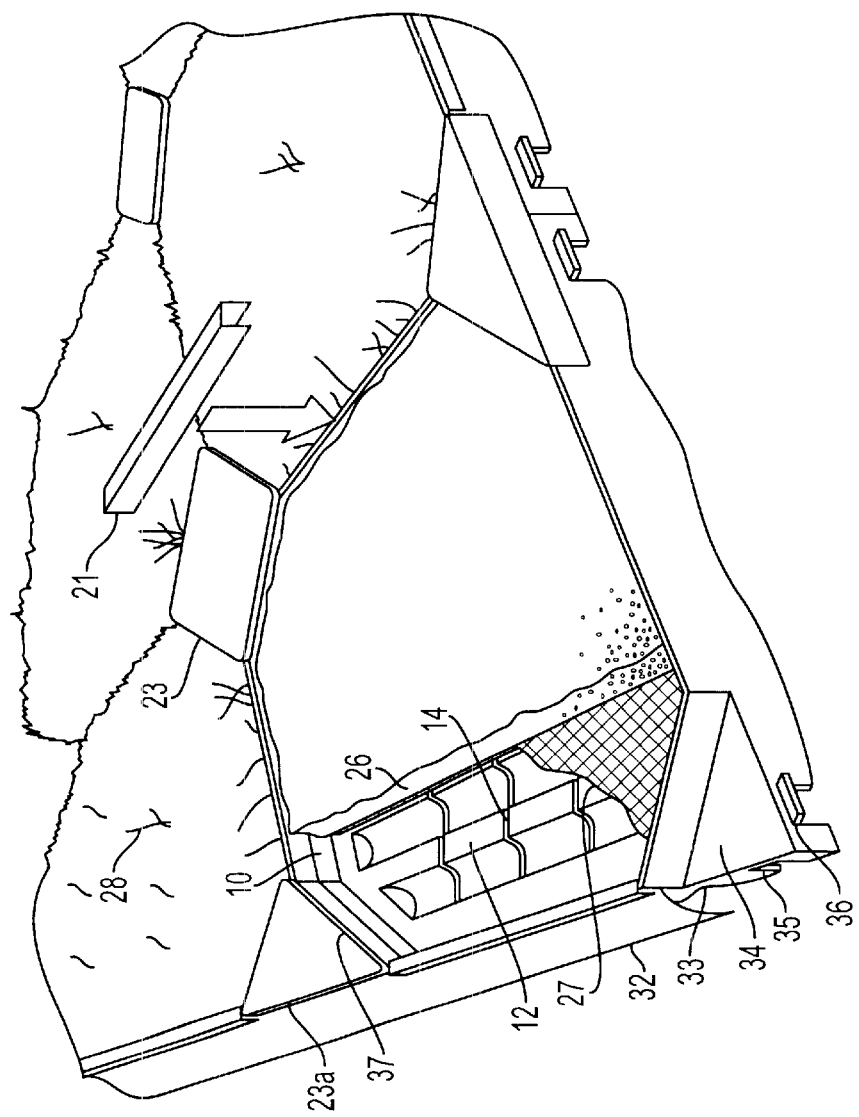
FIG. 6 is a diagrammatical representation of modular trays according to the first embodiment of the present invention shown secured to each other and placed on a roof structure.
Figure 7:
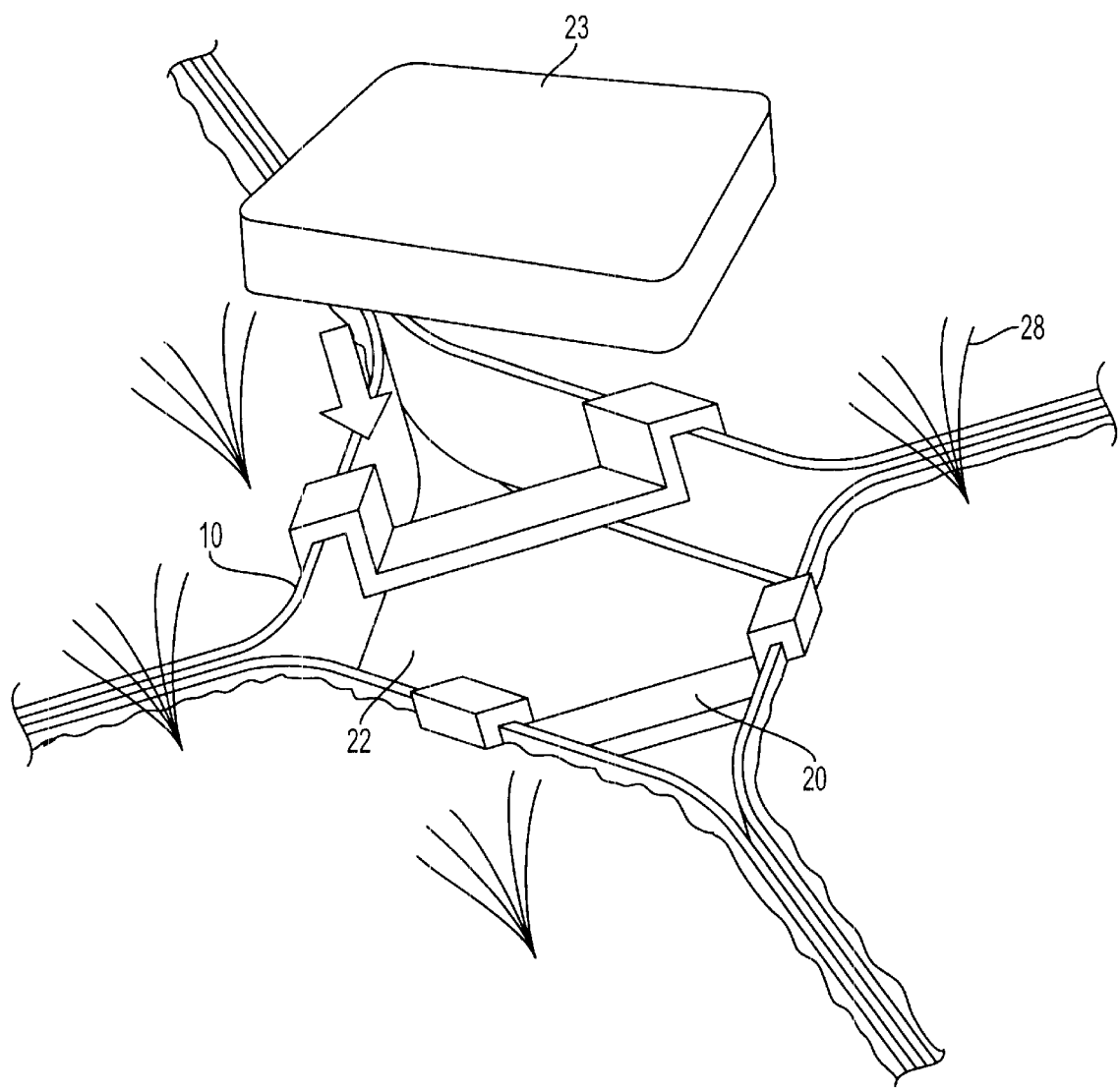
FIG. 7 is a diagrammatical representation of an alternative method of securing the modular trays of the present invention to each other.

Finally, the tray 10 has protrusions 16, 17 for mechanically connecting the tray 10 to another adjacent tray (not shown). The mechanical connection between trays can be made by any known or commonly used method such as by the interlocking the trays or any known mechanical fastening method (i.e. screws, bolts, rivets, adhesive, chemical bonding, spot welding, etc.), or a combination of any of these. The present invention does not limit, in any way, the method by which trays 10 are secured to each other. In FIG. 1, a keystone interlock 16 and connection flange 17 are shown as a method to attach trays to each other. FIGS. 6 and 7 show alternative methods of securing the trays 10 to each other. FIG. 6 shows the trays 10 secured to each other with a separate bracket 21, which is essentially U-shaped (although the shape may vary depending on the design of the tray 10) and secures the walls 13 of two adjacent trays to each other, while also providing a barrier to substantially prevent moisture or precipitation from flowing between adjacent trays 10. FIG. 7 shows yet another alternative for securing the trays 10 to each other, through the use of braces 20 which cross an open area 22 formed between adjacent trays 10, where the braces 20 secure the trays 10 to each other and provide a platform for a ballast weight 23 to aid in keeping the trays 10 secured to the roof structure. If either brackets 21 or braces 20 are used to secure trays 10 to each other, additional fastening can be provided for additional joint security. This can be accomplished by any mechanical fastening method, such as the use of screws, bolts, rivets, adhesive, chemical bonding, spot welding, etc.

Figure 2:
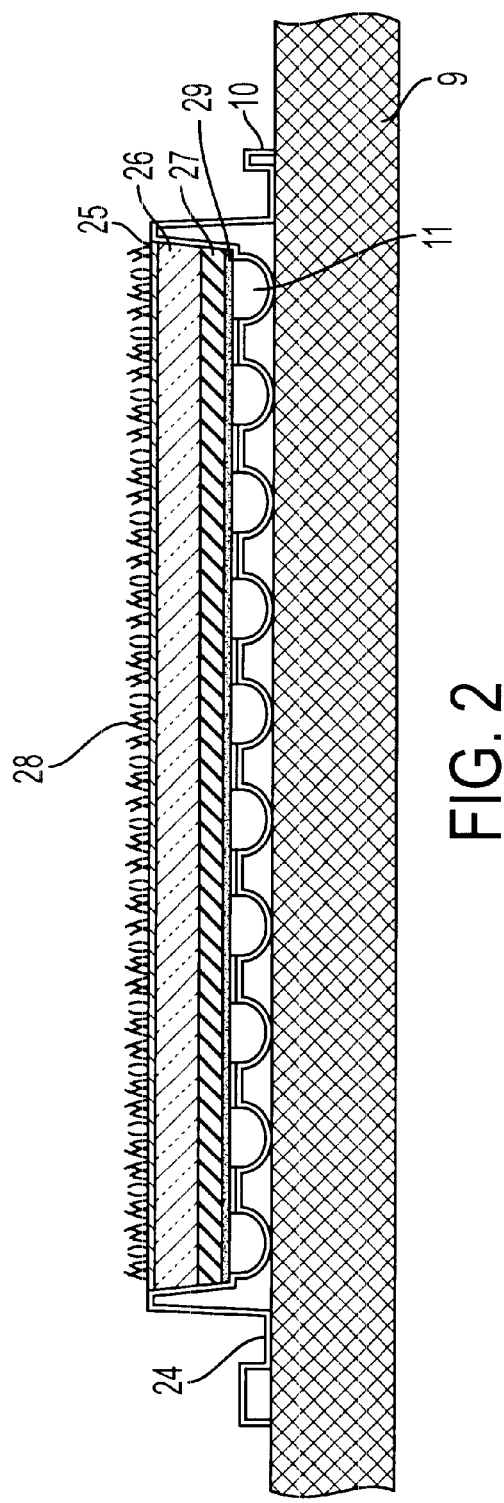
FIG. 2 is a diagrammatical representation of a cross-section of a modular tray according to the first embodiment of the present invention.
Figure 3:
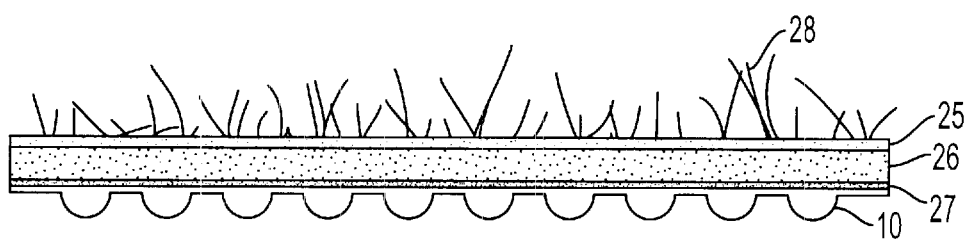
FIG. 3 is a diagrammatical representation of the cross-section of a preferred modular tray configuration according to the first embodiment of the present invention.

FIG. 2 shows a cross-section of a tray 10 according to the first embodiment of the present invention. As shown, the tray 10 can have interlocking ridges 24 around its perimeter which allow the tray 10 to interlock with any adjacent tray 10. This method of locking the trays 10 may be used to secure adjacent trays to each other. Additional mechanical fasteners could be used in this embodiment if desired. In this Figure, the bottoms of the troughs 11 make contact with the roof structure 9, and although this is preferred it is not necessary as the troughs 11 can be raised off of the roof structure 9. FIG. 3 depicts a preferred cross-section of the tray 10 of the present invention. As shown, the tray 10 is manufactured relatively simply, thus keeping cost and materials to minimum, particularly if the tray 10 is made from a stamped metal, where the creation of the ridges 24 is difficult. With this configuration the trays 10 are secured to each other by any known or commonly used mechanical means, such as rivets, screws, bolts, bonding, adhesive, etc.

FIGS. 2 and 3 also depict the layers of the first embodiment. The top layer 25 is the layer which retains the vegetation 28 used in the first embodiment. The vegetation 28 used is selected based on the climate of the region in which the system is installed, and any required or desired aesthetic conditions. It is desirable that the species of vegetation used be native to the region of the installation and have a high tolerance to drought conditions and sustained sunlight exposure. Alternatively, a sedum type species can be used, which has a high drought and sunlight tolerance.

The top layer 25 sits on a growing medium layer 26 which includes a substantially uniform and consistent mixture of a combination of four main components, aggregate, sand, peat and compost, and a fifth sub-component of SAP (super absorbent polymer). A suitable SAP typically comprises about 95% to about 98% crossed linked polyacrylamide copolymer and about 2% to about 5% moisture, and is commercially available from companies such as Aquatrols, 5 North Oinley, Cherryhill, N.J. 08003, and Hydrosource, Castle International Resources, 2370 West Highway 89A #11-300, Sedona, Ariz. 86339-5344. It is noted that the SAP component is not essential, but adds additional absorption capability, and is preferably used in the present invention. Although the exact mixture and composition of this layer 26 varies depending on many conditions, such as the vegetation used, the climate and weather conditions, the density of the growing medium in this layer 26 in the preferred embodiment is approximately 78 lbs./cubic foot. Further, the depth of this layer 26 also varies depending on the various application and design criteria, but is preferably about 2" thick. The growing medium layer 26 is the layer in which the majority of water absorption occurs. The combination of the capillary action in the aggregate used in this layer, along with absorption in the compost and the super absorbent polymer (if used) provides the layer's absorbence.

In a preferred embodiment, the aggregate used in the growing medium layer 26 is a lightweight aggregate consisting of expanded slate or any other lightweight aggregate products such as Permatil®, available from Carolina Stalite Company, P.O. Box 1037, Salisbury, N.C. 28145-1037. An additional example is Minergy LWA®, available from Minergy LWA, 231 W. Michigan St., Milwaukee, Wis. 53205. A preferred composition of the growing medium layer 26 in this embodiment is described below:

Aggregate
  ASTM C29 Dry Weight Loose - 48–55 lbs./ft$^3$
  ASTM C127 Specific Gravity - 1.45–1.60, SSD
  ASTM C330: ASTM Gradation as follows:

| Sieve Size | % Passing |
| --- | --- |
| ½ inch | 100 |
| ⅜ inch | 80–100 |
| #4 | 5–40 |
| #8 | 0–20 |
| #16 | 0–10 |

Aggregate is approximately 60% by volume of the total growing medium.

Sand
  USGA coarse sand consisting of the following grain size distribution (ASTM C136-95A):

| Sieve Size | % Passing |
| --- | --- |
| ⅜ inch | 100 |
| #4 | 95–100 |
| #8 | 85–97 |
| #16 | 60–80 |
| #30 | 10–20 |
| #50 | 5–15 |
| #100 | 0–5 |

Sand is approximately 25% by volume of the total growing medium.

Peat
  Partial Decay and carbonized vegetation consisting mostly of mosses, having a pH between 3.5 and 7.0.
  Peat is approximately 10% by volume of the total growing medium.

Compost
  Compost consists of about 66% of organic yard waste, such as composted leaves, and about 34% of aged poultry litter.
  Compost has the following approximate upper limits:

| | |
| --- | --- |
| Magnesium (Mg) | 70 PPM |
| Iron (Fe) | 3.8 PPM |
| Manganese (Mn) | 1.0 PPM |
| Copper (Cn) | 0.10 PPM |
| Zinc (Zn) | 0.15 PPM |
| Soluble salts | 5.50 mmho/cm | pH falls between 6.0 and 7.0.
  Compost is approximately 4–5% by volume of the total growing medium.

Super Absorbent Polymer (SAP)
  SAP is used to supplement the moisture retention of the growing medium for applications in periodically dry or arid climates.

SAP is applied to the growing medium in granular or powdered form.

SAP need not be more than approximately 1% by volume of the growing medium.

Although the composition above is a preferred growing medium for layer 26, the present invention is not limited to this composition and any known combination of the above materials, and/or their equivalents, can be used. The SAP in the preferred embodiment is capable of absorbing a weight of water or moisture at least 15 times its own weight (although this absorbence not required). This absorption ratio is preferred in the present invention.

As shown in FIG. 2, below the growing matrix layer 26 is a filter layer 27 to prevent the erosion of the growing matrix 26 and to remove particulate from the water runoff to prevent the particulate from blocking the drain holes 14 or otherwise compromising the integrity of the trays 10. In preferred embodiment, filtering of water is performed by a woven polymer geo-textile. The geo-textile can be connected to the tray 10 by any known or commonly used method. In the preferred embodiments, if the tray is made from aluminum the geo-textile can be connected to the tray 10 with pop-rivets (or any similar method) around the perimeter. If the tray 10 is made from plastic or an injection molded polymer, the geo-textile can be connected to the tray 10 with heat stakes, such that the filter fabric is placed over polymer stakes secured to the tray along the perimeter. The heat stakes (not shown) are molded into the tray 10 and the stakes pretrude through the geo-textile to hold it in place. Heat is then used to melt the polymer of the heat stakes to the geo-textile. It is preferred that the stake melting process be accomplished by a sonic welding process, but any commonly known or used method of attaching the geo-textile to the tray 10 can be. The geo-textile used is preferably composed of high-tenacity mono and multifilament polypropylene yarns, which are woven into a stable network in which the yarns retain their relative position. An example of a yarn used in a preferred embodiment of the present invention is Mirafi FW500®, available from TC Mirafi, 365 South Holland Drive, Pendergrass, Ga. 30567. It is also preferred that the yarn material be inert to biological degradation and resistant to environmental chemicals, such as alkalis and acids. The preferred material has a thickness of approximately 24 mils, with a tensile strength of about 2100 to 2400 lbs./ft, and a puncture strength of at least about 135 lbs. The permeability rate, in the preferred embodiment, is at most about 0.027 cm/sec, with a flow rate of at most about 35 gal/min/ft$^2$.

Figure 5:
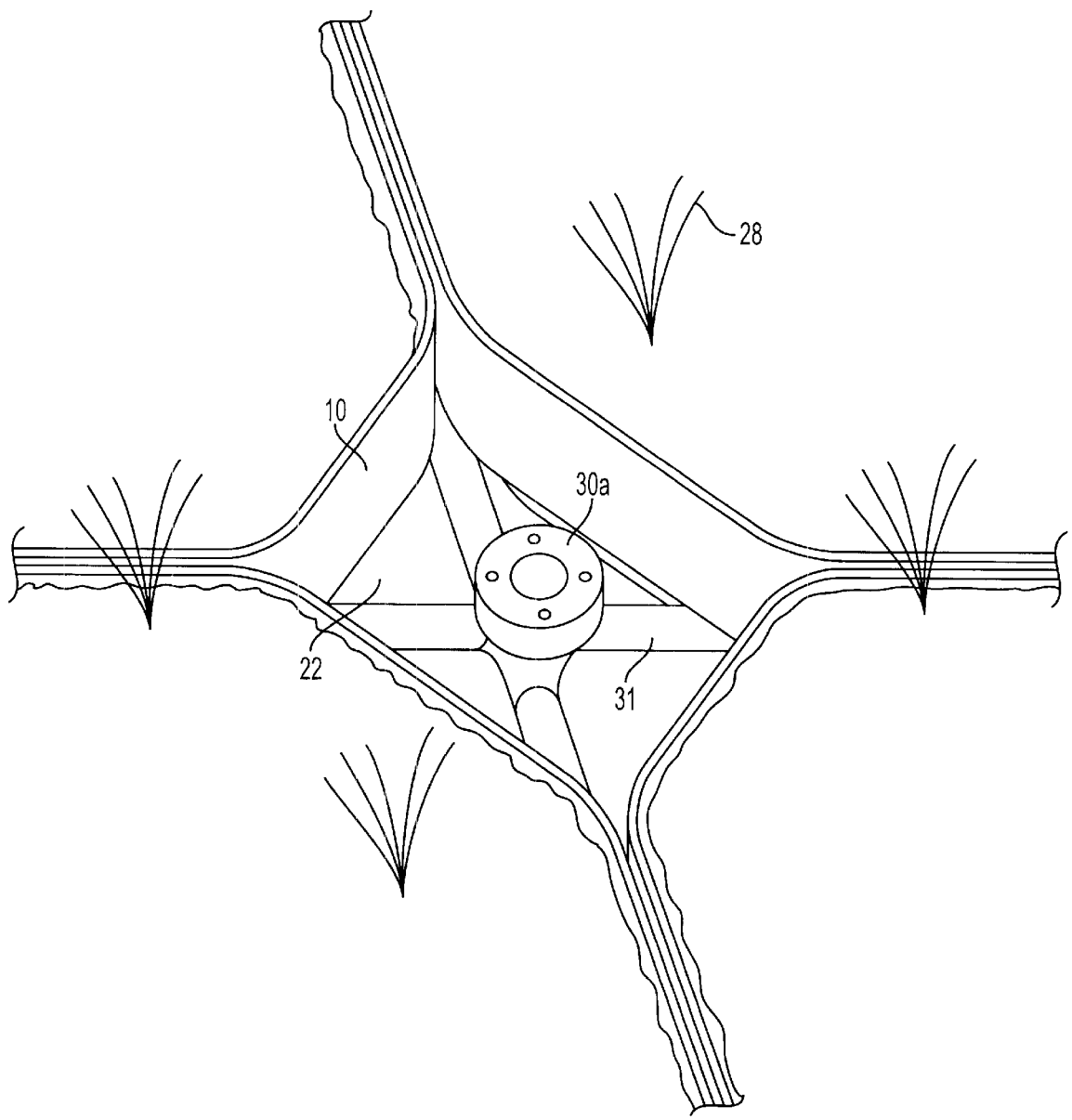
FIG. 5 is a diagrammatical representation of a preferred sprinkler head and system used with the present invention.

FIG. 5 shows a preferred configuration of the sprinkler system in which a sprinkler head 30a is positioned in the open area 22 between trays 10. Although this sprinkler system is depicted in FIG. 5 in combination with the first embodiment of the present invention, it may be used with any of the embodiments disclosed herein.

Figure 4:
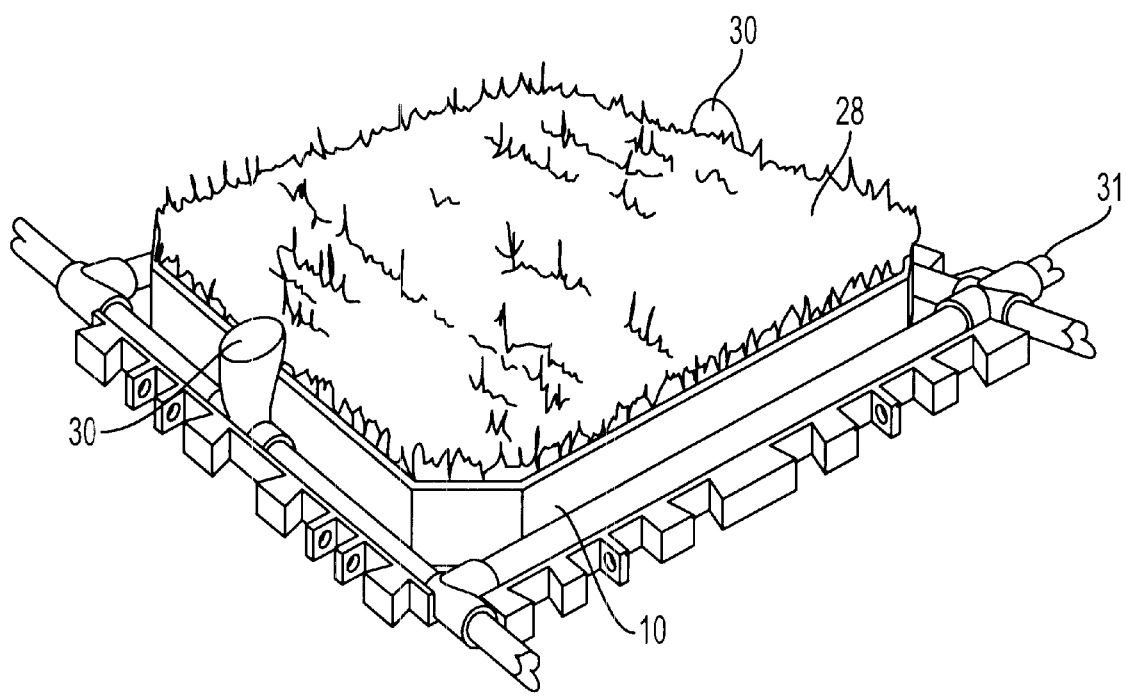
FIG. 4 is a diagrammatical representation of a modular tray according to the first embodiment of the present invention.

FIG. 4 shows a single tray 10, with vegetation 28 growing, according to the first embodiment of the present invention, with optional sprinkler heads 30 and an alternative sprinkler system plumbing 31. The use of a sprinkler system 30, 31 depends on the climate and desired performance of the roof covering system. The sprinkler system can be used both to provide additional cooling for the roof of the building and to support the vegetation 28 growth in arid and hot climates. Any standard or commonly known sprinkler or irrigation system can be used in the present invention.

Figure 8:
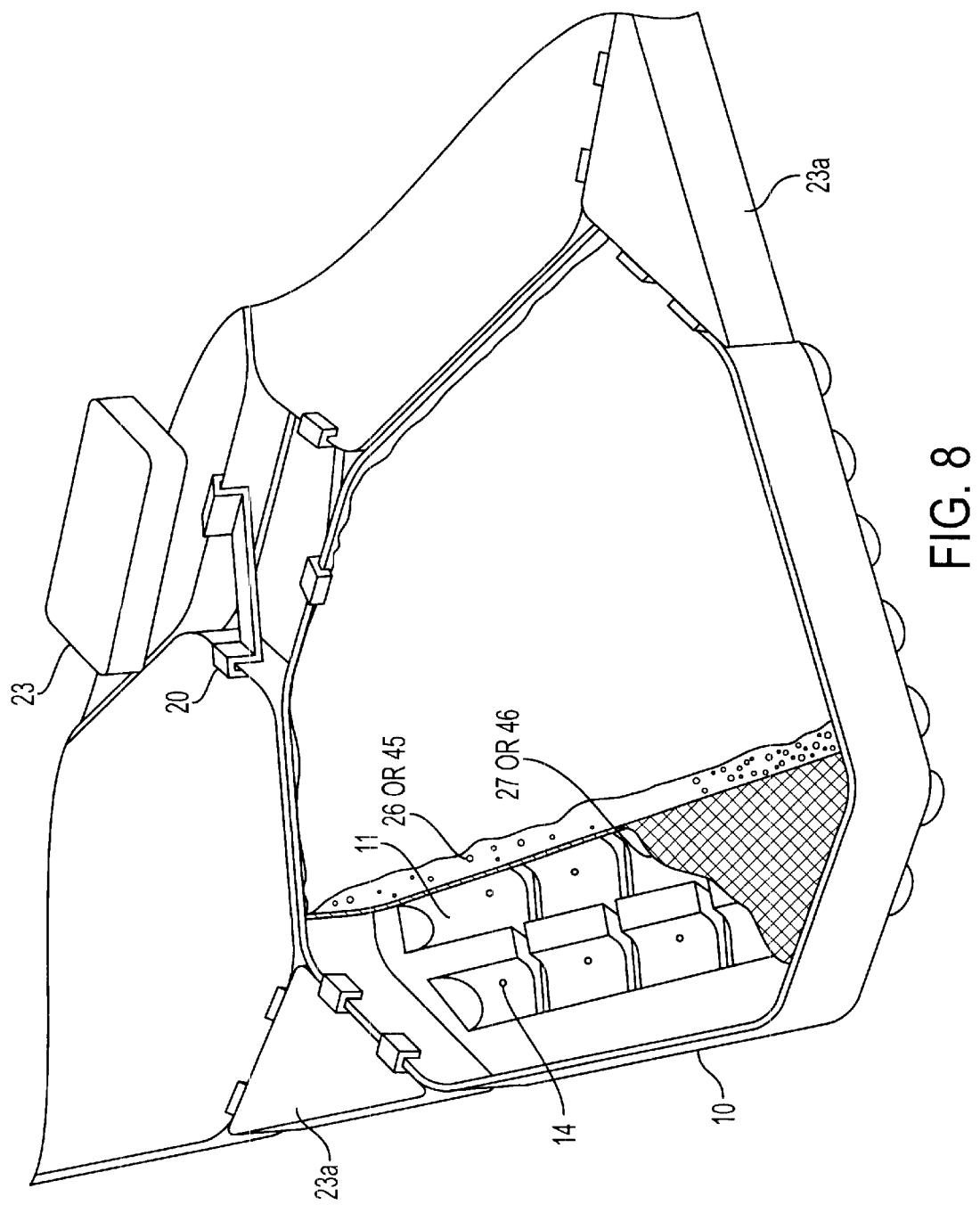
FIG. 8 is a diagrammatical representation of the preferred embodiment of the modular tray according to the first embodiment of the present invention shown installed on a roof structure.

In FIGS. 6 and 8, the installation of the present invention according to the first embodiment is shown. The installation consists of a plurality of individual trays 10 connected to each other by any of the previously discussed methods, although the use of the channel 21 is shown. A plurality of paving stones 23 and 23a are used as ballast to ensure the structural integrity of the system under adverse weather conditions. The ballast used can be any structure which provides sufficient weight to keep the installed system on the roof surface. In a preferred embodiment, the ballast material supports the weight of a person walking on the ballast without damage, for example, monolithic concrete. This prevents unnecessary damage to the tray modules 10, and the tray contents. It is preferred that the ballast or paving stones be shaped to fit the openings 22 created by the trays 10 when the trays are assembled on the roof, and that the ballast fill substantially all of the space within the open area 22.

Also shown in FIG. 6 is a tray protector 37 which is made of extruded aluminum which engages with the tray wall, and is locked into place by any type of common mechanical connection. The tray protector 37 is optional and provides added protection of the tray edges 13 from damage and fire. Further, FIG. 6 shows a perimeter flashing 32 that may be used on the outside perimeter of the tray installation area, to protect the tray area perimeter from damage and fire. The flashing 32 can be fastened to the tray 10 by any commonly used or known mechanical attachments and can be made as part of the tray 10 during manufacture. In the preferred embodiment, perimeter drainage 33 is provided in the trays 10 to allow water draining from the trays 10 to flow freely under the trays 10.

Additionally, the trays 10 are shown with an access slot 35 and tray alignment tab 36 which are also preferred. The access slot 35 allows installation of the sprinkler system, if used, and the tab 36 allows for the easy alignment of trays 10 during installation, while also providing added structural integrity to the tray array under adverse conditions. Finally, as shown in FIG. 6, ballast or paving stones 23 and 23a may be supported by a ballast shelf 34 which extends from the trays 10. In a preferred embodiment the shelves 34 are integral with the tray 10. Alternatively, separately formed shelves can be attached to the trays 10.

In a preferred embodiment, the ballast or paving stones 23, 23a are suspended some distance above the roof. This allows the maximum weight of the ballast applied to the trays to maximize the efficiency of the ballast.

FIG. 8 depicts trays 10 made in accordance with the preferred embodiment of the present invention shown cross-section in FIG. 3.

Figure 9:
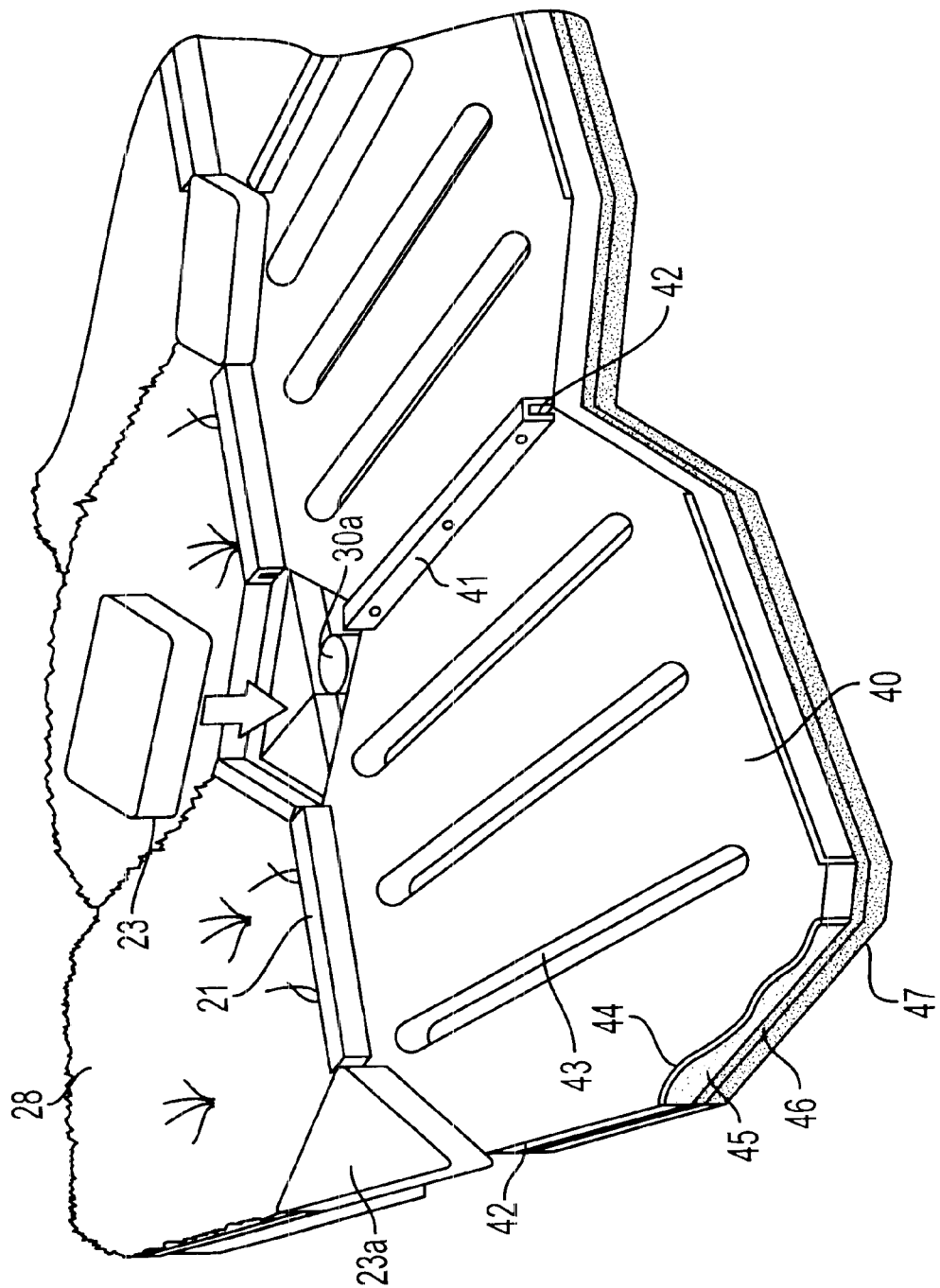
FIG. 9 is a diagrammatical representation of a second embodiment of the present invention shown secured on a roof structure.
Figure 10:
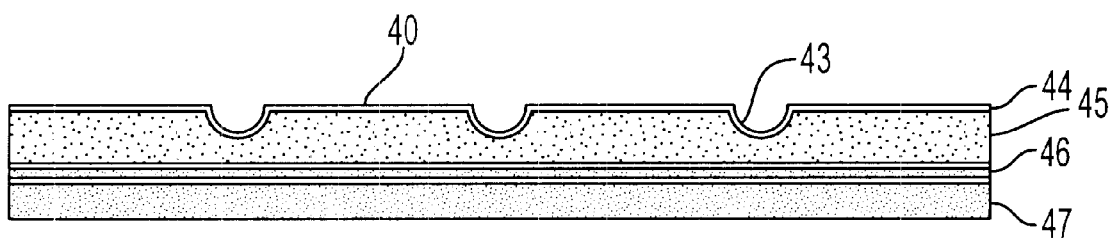
FIG. 10 is a diagrammatical representation of a cross-section of the modular tray according to the second embodiment of the present invention.

In FIGS. 9 and 10 a second embodiment of the present invention is shown, in which vegetation is not used, but instead an absorbent bag 40 is employed, which is made to fit inside the tray 10. The bag 40 is made up a series of layers to absorb water and retard runoff. The top layer 44 is made of any known water-permeable material which allows water to pass through to the layers beneath. In a preferred embodiment, the top layer is made of a material which also protects the contents of the bag 40 from UV radiation. Under the water permeable layer 44 is a water absorption layer 45 which captures, stores and slowly releases water, moisture and precipitation through either drainage or evaporation. This layer may also include an SAP to further increase the water absorption of this layer. The water absorption layer 45 can be made of any known material which has the above characteristics (including, for example, newspaper, cardboard, cellulose or carpet). The material does not degrade significantly over time, to ensure maximum performance of the system. In a preferred embodiment, this layer 45 is also protected from UV radiation to extend the operational life of this layer. The thickness and other dimensions of this layer are easily selected for a desired application. In a preferred embodiment, the dry thickness of this layer is about ½ inch in thickness, and its saturated thickness is about 2 inches. A thicker and larger layer retains more water thus increasing weight loads. Below the water absorption layer 45 is a filter layer 46 similar in construction to the filter layer in the first embodiment of the present invention, which can also have a non-woven geo-textile layer 47. Layer 47 functions as a drainage layer for the water absorption layer 45, and for water that drains from the roof in overflow conditions or from areas that are not covered by the modular system. A suitable material for the bag 40 is commercially available from National Sorbents, Inc., 10139 Commerce Park Drive, Cincinnati, Ohio 45246.

This layer 47 allows water to flow underneath the modular system, when it is installed on a roof. In a preferred embodiment, the non-woven structure of this layer 47 has a high compression strength (up to 20,000 psi). An example of the material that can be used is Miradrain G100W®, available from TC Mirafi, 365 South Holland Drive, Pendergrass, Ga. 30567. This product has a three-dimensional, non-woven matrix that is adhered to a filter fabric, similar to Mirafi FW500® or Mirafi 140NC®. Other similar materials can be used. For example, a nylon non-woven geo-textile, such as Mirafi Enkamat 7018®, 7020®, or 7920® can be used and adhered to a layer of Mirafi FW500® to form layer 47.

Although the bag 40 of this embodiment can be manufactured in a number of commonly known ways, preferably the bag 40 is constructed as a sewn bag, where all of the layers are sewn together, and the sides of the bag are the same material as the top of the bag. In a preferred embodiment, reservoirs 43 are formed in the top surface of the bag 40 which capture water and hold it while it is slowly absorbed into the water absorption layer 45. The exact configuration, number and depth of the reservoirs vary with the design of the bag 40 and the system.

The bag 40 may also include connection flaps 42, sewn or made integrally with the bag 40, which allow bags 40 connected to each other by bag connector 41. This connection provides added system integrity over the use of the tray connectors 21 alone. It is also possible to use mechanical fasteners such as screws, bolts, rivets, adhesive, chemical bonding, spot welding, etc. in addition to the bag connector 41, to increase joint integrity. Bag 40 can also be used in another embodiment of the present invention in which a plurality of the sewn bags 40 are secured to each other and placed on the roof structure, without trays 10. The flaps 42 then allow the bags 40 adequately secured to each other. In the embodiment, the bottom layer of the bags is a filter layer designed to permit water which is not absorbed to flow freely off the roof surface.

The sprinkler system previously described may be used to optimize the performance of the roof system when using the bags 40. Additionally, the paving stones 23, 23a previously described can be used as ballast to secure the bag system on the roof.

Figure 11:
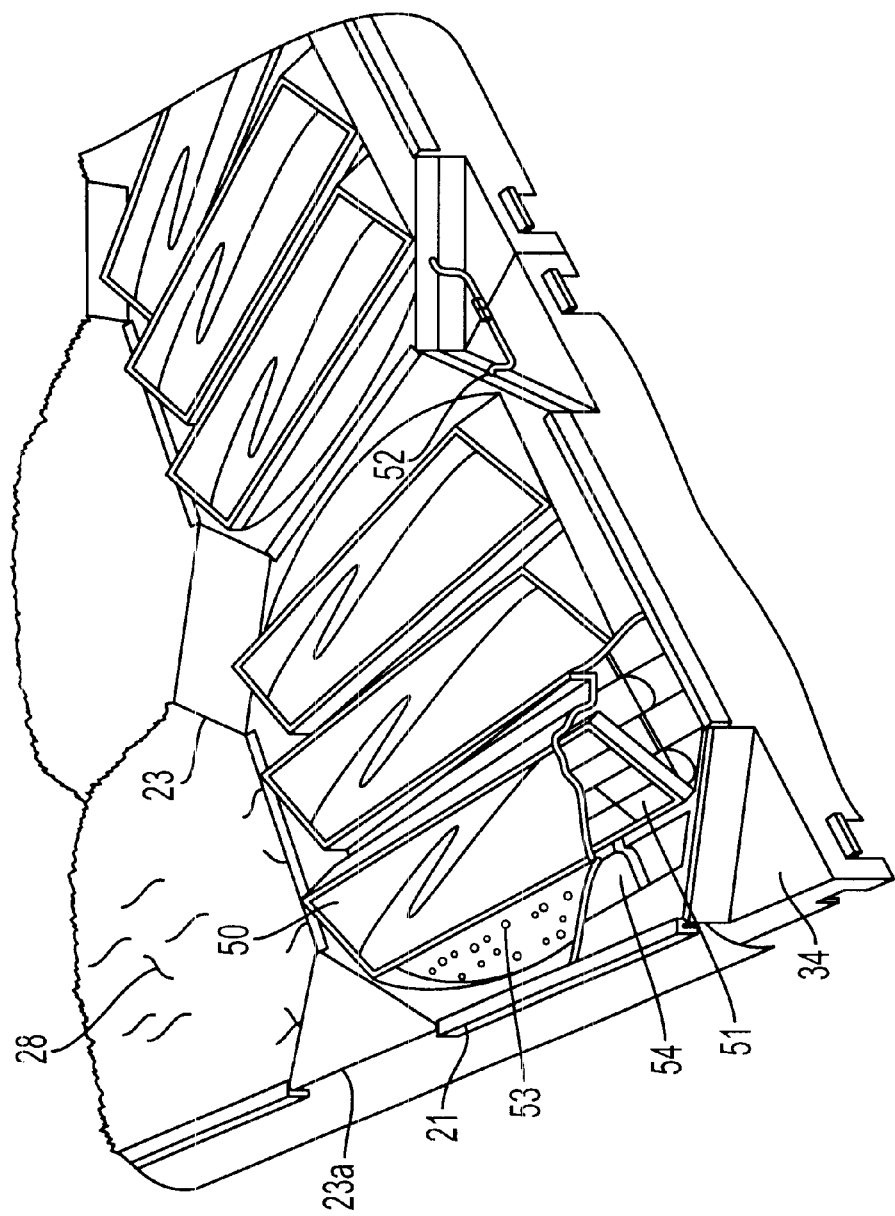
FIG. 11 is a diagrammatical representation of a modular tray according to the third embodiment of the present invention shown secured to other trays and placed on a roof structure.

The third embodiment of the present invention is shown in FIG. 11. In this embodiment, the top layer consists of a formed housing 50 formed to hold photovoltaic cells 51 and drainage holes 53, which allow water to pass through the housing 50 into layers underneath the housing 50. This embodiment also uses the standard modular tray 10, thus allowing the components present in the trays varied while using the same trays. The housing 50 is made of a material which provides adequate protection from the elements for the cells 51, but is also substantially transparent to allow sunlight to pass through to allow optimum performance of the cells 51. Preferably injected molded clear plastic is used for the housing. Because some plastics and polymers have relatively poor longevity when exposed to UV radiation for extended periods of time, in a preferred embodiment the housing 50 is made from glass, or a similar material, or stamped aluminum with glass windows. Further, in a preferred embodiment, the housing 50 has a mechanism allowing the housing to pivot and rotate to allow the photovoltaic cells 51 to track the sun. The cells 51 used can be any known or commercially available cells and are suitably chosen to meet system requirements. The cells are electrically connected to each other through a standard connection 52. In a preferred embodiment the trays 10 have access holes allowing electrical connections 52 without interfering with a sprinkler system or the ballast weights 23, 23a.

Although the shape and design of the housing 50 vary with the particular design of the system and cells used, in a preferred embodiment, the housing 50 has at least two major faces, and each face is inclined at an angle to the floor of the tray 10. The housing 50 also has at least one drainage channel adjacent to at least one of the inclined faces so that precipitation and water coming from the face(s) can flow into the channel. Preferably the channel is formed integrally in the housing. The drainage channel has at least one drainage hole to allow water in the channel to flow into the reservoir 54 below the housing 50.

Below the housing 50 is a reservoir 54, which captures and slowly releases water and precipitation via drainage and/or evaporation, either through drain holes in the reservoir 54 or through the holes 53 in the housing 50. The drain holes in the reservoir are positioned to prevent overfilling of the reservoir. Optionally, the water absorption layer of the second embodiment is used in the reservoir to provide additional absorption and stability.

Figure 12:
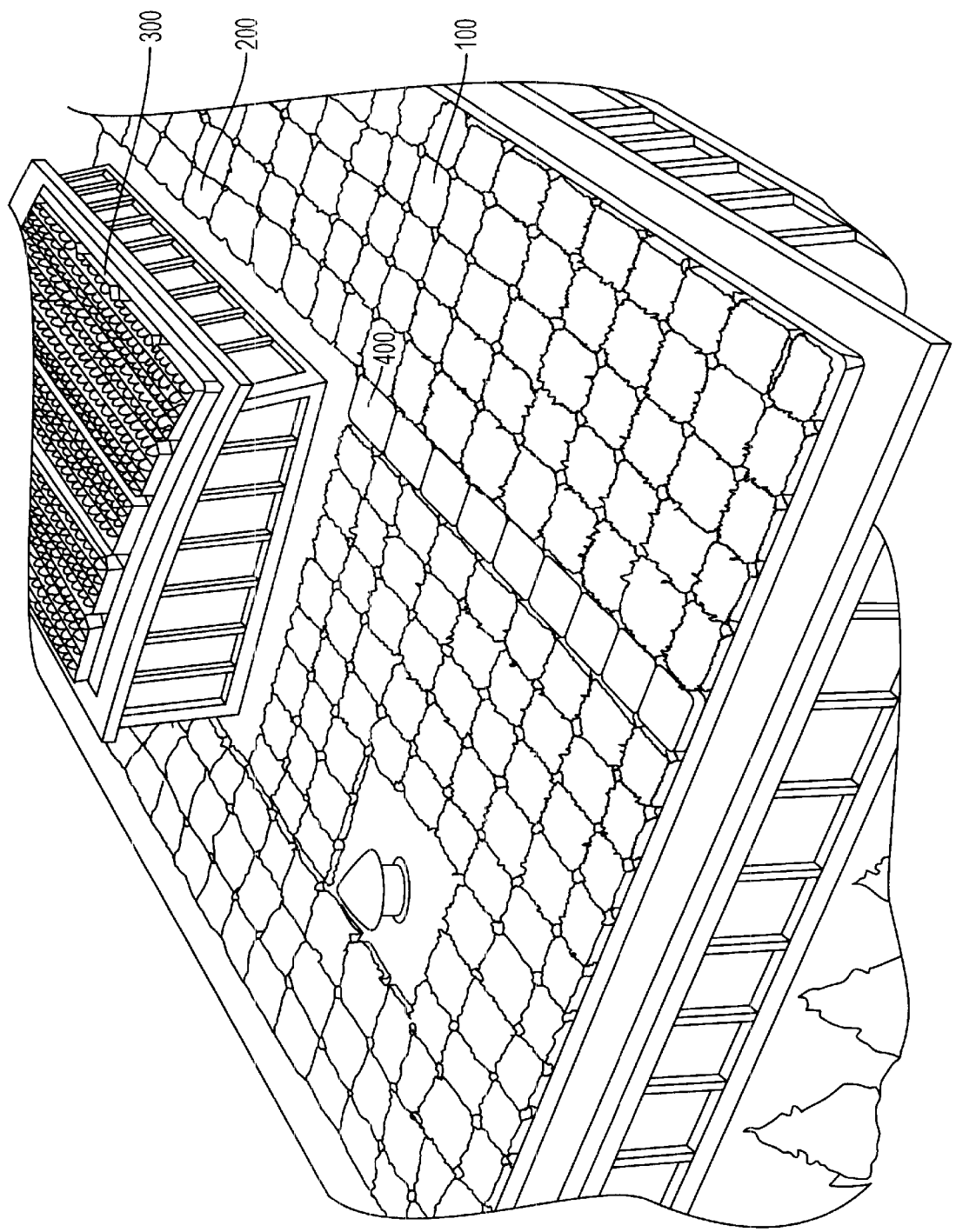
FIG. 12 is a diagrammatical representation of the roof of a building having a plurality of trays of the present invention, where a representation of each of the embodiments is shown in position on the roof structure.

A combination of any or all of the modular embodiments described herein may be used in a single system. FIG. 12 shows a combination of these embodiments. FIG. 12 shows a roof system in accordance with the present invention, having a plurality of tray assemblies made in accordance with the first embodiment 100, second embodiment 200, and third embodiment 300. Further, in order to provide roof access and mobility, paths of trays 400 are shown, which are empty or have paving stones configured to fit in the tray. Any known type of pathway material can be used and placed in the pathway trays 400.

It is of course understood that departures can be made from the preferred embodiments of the invention by those of ordinary skill in the art without departing from the spirit and scope of the invention that is limited only by the following claims.

What is claimed is:

1. A modular roof covering system for application over a roofing membrane, comprising:

(a) a plurality of interlocking container modules, (b) means for attaching each of said container modules to at least one other of said container modules to provide a stable matrix of said interlocking container modules, (c) each of said container modules comprising a substantially continuous outer wall that is substantially perpendicular to a roof surface, said wall separating the interior of said container module from the exterior of said container module, (d) at least one portion of said outer wall of each container module in said matrix, in combination with at least one portion of said outer wall of at least one adjacent container module defining an interstitial area in said matrix that is exterior to the outer wall of each said attached container module, (e) ballasting means disposed in said interstitial area for maintaining said stable matrix of interlocking container modules in place on said roofing surface, and (f) at least one medium disposed in said interior of at least one of said container modules, said medium comprising means for absorbing precipitation falling on said matrix, whereby said matrix of interlocking container modules retards the discharge of water associated with said precipitation from said roof surface into the environment.

2. The modular roof covering system as claimed in claim 1, wherein:

(a) each of said container modules further comprises a floor section attached to a lower portion of said outer wall, said outer wall being substantially perpendicular to said floor section, (b) said matrix comprises at least one container module forming an interior portion of said matrix, each container module present in said interior portion of said matrix being connected to at least one container module forming a peripheral edge of said matrix, and (c) each of said container modules present in said matrix further comprises means for supporting said ballasting means in said interstitial area.

3. The modular roof covering system as claimed in claim 2, said means for supporting said ballasting means comprising at least one support member extending from said exterior surface of said outer wall into said interstitial area.

4. The modular roof covering system as claimed in claim 2, said means for supporting said ballasting means comprising a portion of said container floor section extending beyond said outer wall into said interstitial area.

5. The modular roof covering system as claimed in claim 2, wherein said floor section disposed in the interior of said container module comprises means for draining water from said container module.

6. The modular roof covering system as claimed in claim 2, wherein:

(a) said outer wall of each of said container modules comprises eight substantially planar wall sections connected to form said substantially continuous outer wall, and (b) said container module formed by said eight substantially planar wall sections and said floor section is a substantially rectangular tray having beveled corners, said beveled corners forming said interstitial area when two or more container modules are attached in said matrix.

7. The modular roof covering system as claimed in claim 6, wherein said container module is a substantially square tray having beveled corners, said beveled corners forming said interstitial area when two or more container modules are attached in said matrix.

8. The modular roof covering system as claimed in claim 2, wherein:

(a) said drainage means comprises a plurality of parallel troughs forming depressions in said floor section of said container module, (b) a plurality of said troughs extends a majority of the length of said floor section disposed within said outer wall of said container module, (c) at least one end wall of at least one of said troughs is penetrated by at least one hole provided at a predetermined distance from the floor of said trough, to permit excess water to flow out of said trough, (d) said plurality of troughs formed in said floor section extend below the bottom edge of said outer wall of said container module, the bottom portion of said troughs contacting said roof membrane, to provide a base on which said container module rests, and (e) said container modules in said matrix are aligned such that said troughs in adjacent container modules are substantially parallel, whereby water discharged from said drainage means flows beneath said container modules, between said plurality of troughs, on said roof surface to the edge of said matrix.

9. The modular roof covering system as claimed in claim 2, comprising means for filtering water, (a) said means for filtering water being disposed in said container module between said means for draining water from said container module and said medium, and (b) said means for filtering water permitting water to pass into said means for draining water, while substantially preventing said medium from passing into said means for draining water.

10. The modular roof covering system as claimed in claim 8, comprising means for filtering water:

(a) said means for filtering water being disposed in said container module between said means for draining water from said container module and said medium, and (b) said means for filtering water permitting water to pass into said means for draining water, while substantially preventing said medium from passing into said means for draining water.

11. The modular roof covering system as claimed in claim 2, wherein said container module comprises a plastic, injection-molded tray comprising molded means for draining excess water and molded means for supporting said ballasting means.

12. The modular roof covering system as claimed in claim 2, wherein:

(a) said ballasting means is a monolithic structure resting on said means for supporting said ballasting means in said interstitial area, (b) said monolithic structure substantially fills at least the upper portion of said interstitial area, and (c) said monolithic structure being is capable of supporting sufficient weight to provide access to said container modules by maintenance personnel stepping on said monolithic structure.

13. The modular roof covering system as claimed in claim 9, wherein said medium comprises a lightweight means for supporting plant growth in said medium.

14. The modular roof covering system as claimed in claim 13, wherein at least one predetermined plant variety is grown in said lightweight means for supporting plant growth, said plant growth utilizing at least said precipitation absorbed by said means for absorbing precipitation, such that the surface of said medium is substantially covered by said plant growth during the normal growth season of said at least one predetermined plant variety.

15. The modular roof covering system as claimed in claim 14, wherein said lightweight means for supporting plant growth comprises at least one superabsorbent polymer in combination with at least one component selected from the group consisting of lightweight aggregate, sand, and compost.

16. The modular roof covering system as claimed in claim 11, further comprising means for irrigating said container modules.

17. The modular roof covering system as claimed in claim 1, wherein said means for absorbing precipitation comprises a superabsorbent polymer capable of absorbing an amount of water having a weight that is at least about 15 times the weight of said polymer.

18. The modular roof covering system as claimed in claim 13, wherein said means for absorbing precipitation comprises a superabsorbent polymer capable of absorbing an amount of water having a weight that is at least about 15 times the weight of said polymer.

19. The modular roof covering system as claimed in claim 8, wherein said means for absorbing precipitation comprises a superabsorbent polymer capable of absorbing an amount of water having a weight that is at least about 15 times the weight of said polymer.

20. The modular roof covering system as claimed in claim 19, wherein at least one of said container modules present in said matrix further comprises at least one formed housing containing a photovoltaic array mounted on the upper surface said outer wall of said container module.

21. The modular roof covering system as claimed in claim 20, wherein said formed housing containing said photovoltaic array is a glass or stamped aluminum component comprising end sections adapted to conform to the upper surface of said outer wall of said container module.

22. The modular roof covering system as claimed in claim 21, wherein said housing containing said photovoltaic array:
  (a) comprises at least two major faces, each of which is inclined at least one predetermined angle from a plane perpendicular to the floor of said container module, said plane being aligned along the axis of said major faces,
  (b) further comprises at least one drainage channel integral with at least one major face of said housing, and
  (c) said drainage channel has at least one opening connecting the surface of said drainage channel with the interior of said container module containing said superabsorbent polymer mat,
  whereby precipitation draining from said inclined major faces is collected in said drainage channel and is drained into the interior of said container module.

23. The modular roof covering system as claimed in claim 22, wherein a plurality of said formed housings each containing a photovoltaic array is mounted on the upper outer wall surface of a single container module, said plurality of photovoltaic arrays being electrically connected to form a single circuit.

24. A modular roof covering system as claimed in claim 5, said stable array of interlocking container modules comprising the combination of (a) and (b), wherein (a) and (b) are defined as follows:
  (a) a plurality of said interlocking container modules disposed on a roof membrane, each comprising:
    (1) drainage means comprising a plurality of parallel troughs forming depressions in said floor section of said container module,
    (2) a plurality of said troughs extending a majority of the length of said floor section disposed within said outer wall of said container module,
    (3) at least one end wall of at least one of said troughs being penetrated by at least one hole provided at a predetermined distance from the floor of said trough, to permit excess water to flow out of said trough,
    (4) said plurality of troughs formed in said floor section extending below the bottom edge of said outer wall of said container module, the bottom portion of said troughs contacting said roof membrane, to provide a base on which said container module rests,
    (5) wherein said container modules in said matrix are aligned such that said troughs in adjacent container modules are substantially parallel,
    (6) whereby water discharged from said drainage means flows beneath said container modules, between said plurality of troughs, on said roofing membrane to the edge of said matrix,
  and further comprising:
    (7) means for filtering water, said means for filtering water being disposed in said container module between said means for draining water from said container module and said medium, said means for filtering water permitting water to pass into said means for draining water, while substantially preventing said medium from passing into said means for draining water,
    (8) said medium comprising a lightweight means for supporting plant growth in said medium,
    (9) wherein at least one predetermined plant variety is grown in said lightweight means for supporting plant growth, said plant growth utilizing at least said precipitation absorbed by said means for absorbing precipitation, such that the surface of said medium is substantially covered by said plant growth during the normal growth season of said at least one predetermined plant variety,
  in combination with
  (b) a plurality of said interlocking container modules, each comprising:
    (1) drainage means comprising a plurality of parallel troughs forming depressions in said floor section of said container module,
    (2) a plurality of said troughs extending a majority of the length of said floor section disposed within said outer wall of said container module,
    (3) at least one end wall of at least one of said troughs being penetrated by at least one hole provided at a predetermined distance from the floor of said trough, to permit excess water to flow out of said trough,
    (4) said plurality of troughs formed in said floor section extending below the bottom edge of said outer wall of said container module, the bottom portion of said troughs contacting said roof membrane, to provide a base on which said container module rests,
    (5) said container modules in said matrix being aligned such that said troughs in adjacent container modules are substantially parallel,
    (6) whereby water discharged from said drainage means flows beneath said container modules, between said plurality of troughs, on said roofing membrane to the edge of said matrix,
    (7) said at least one medium comprising means for absorbing precipitation comprises a superabsorbent polymer capable of absorbing an amount of water having a weight that is at least about 15 times the weight of said polymer,
    (8) said superabsorbent polymer is contained in a cross-linked mat disposed on said container module floor, and further comprising:
- (9) at least one formed housing containing a photovoltaic array, said housing being mounted on the upper surface said outer wall of said container module,
- (10) said formed housing being a substantially transparent, injection-molded plastic component comprising end sections adapted to conform to the upper surface of said outer wall of said container module,
- (11) said formed housing containing said photovoltaic array:
  - (i) comprising at least two major faces, each of which is inclined at least one predetermined angle from a plane perpendicular to the floor of said container module, said plane being aligned along the axis of said major faces,
  - (ii) further comprising at least one drainage channel integral with at least one major face of said housing,
  - (iii) said drainage channel having at least one opening connecting the surface of said drainage channel with the interior of said container module containing said superabsorbent polymer mat,
  - (iv) whereby precipitation draining from said inclined major faces is collected in said drainage channel and is drained into the interior of said container module, and
- (12) said photovoltaic array being electrically connected to form a single circuit.

* * * * *